United States Patent [19]

Fonte et al.

[11] Patent Number: 5,095,064
[45] Date of Patent: Mar. 10, 1992

[54] COATING COMPOSITION BASED ON FLUORINATED POLYMERS, TO BE USED AS A PRIMER

[75] Inventors: Alberto Fonte, Pavia; Angelo Tentorio, Novara; Mario Visca, Alessandria, all of Italy

[73] Assignee: Ausimont S.p.A., Milan, Italy

[21] Appl. No.: 511,949

[22] Filed: Apr. 16, 1990

Related U.S. Application Data

[63] Continuation of Ser. No. 361,677, Jun. 2, 1989, abandoned, which is a continuation of Ser. No. 95,610, Sep. 11, 1987, abandoned.

[30] Foreign Application Priority Data

Sep. 16, 1986 [IT] Italy ............................. 21709 A/86

[51] Int. Cl.$^5$ ................................................ C08K 3/32
[52] U.S. Cl. .................... 524/413; 524/414; 524/417; 524/434; 524/436
[58] Field of Search ............... 524/413, 414, 417, 434, 524/436

[56] References Cited

U.S. PATENT DOCUMENTS

| | | | |
|---|---|---|---|
| 2,979,418 | 4/1961 | Dipner | 525/481 |
| 3,931,084 | 1/1976 | Buckley | 524/414 |
| 3,989,873 | 11/1976 | Robertson | 524/413 |

*Primary Examiner*—Joseph L. Schofer
*Assistant Examiner*—Peter Mulcahy
*Attorney, Agent, or Firm*—Morgan & Finnegan

[57] ABSTRACT

A composition suitable to form coating films on metal substrates, in particular acting as a primer, comprising an aqueous dispersion of a tetrafluoroethylene polymer and/or copolymer, containing phosphate ions and other anions of mineral acids and furthermore Mg and/or Mn in the form of divalent cations, the phosphate anion amount being such that, expressed as phosphorus/dry polymer weight ratio, it ranges from 0.005 to 0.15, and the amount of Mg ions and/or Mn ions being such that the Mg+Mn/P ratio expressed in atoms ranges from 0.1 to 2.

5 Claims, No Drawings

COATING COMPOSITION BASED ON FLUORINATED POLYMERS, TO BE USED AS A PRIMER

This application is a continuation of application Ser. No. 361,677, filed June 2, 1989 now abandoned which is a continuation of Ser. No. 095,610, filed Sept. 11, 1987, abandoned.

FIELD OF THE INVENTION

This invention relates to a compositions suitable to form a coating layer on metal articles, in particular on iron or aluminium or their alloys articles, said coating layer having a very high adhesion to the metal substrate and being utilizable as a primer for the application of subsequent finishing coating layers.

BACKGROUND OF THE INVENTION

It is generally known to use polytetrafluoroethylene (PTFE) aqueous dispersions in order to obtain coatings exhibiting high stabilities to heat and to chemical agents with good properties of mechanical resistance to wear and to friction. It is known as well to use PTFE modified with little amounts of a comonomer, which in most cases is fluorinated, as well as to use mixtures of PTFE with other fluorinated polymers, in order to obtain improved characteristics of imperviousness and flexibility of the coating layer. The essential technical problem in the production of these coatings consists in the adhesion to the metal substrate, such adhesion having to be very high, also in consideration of the temperatures, often very high, which the articles are subjected to in use.

A good adhesion is attainable with the presence of chromic acid in the polymer aqueous dispersion, in particular in combination with phosphoric acid. This system is not allowable if the treated articles are utilized in the foodstuffs sector, due to the high toxicity of the chromic acid, which is present, although only in traces, in the obtained polymeric coating layer.

From U.S. Pat. No. 3,634,353 it is known how to use monobasic phosphates of divalent cations in combination with phosphoric acid for the preparation of coating compositions.

In this patent it is of substantial importance, in order to obtain a good adhesion, that the molar ratio: cations/$PO_4^{--}$ should be <0.5.

In particular, calcium is designated as the preferred cation. Tests carried out by the Applicat hereof have proved that this limit is critical in order to obtain good adhesion (See example 1A on pages 10, 11 and 12).

THE PRESENT INVENTION

Thus, it is an object of the present invention to provide a coating layer acting as a primer, which is endowed with a very high adhesion to the substrate, is free from high toxicity components, is safe and easy to apply to the article to be coated.

A coating layer exhibiting such features can be prepared by using the composition according to the invention, which consists of a fluorinated polymer aqueous dispersion containing, in defined ratios, phosphoric anions, anions of various mineral acids, in particular $NO_3^-$, $SO_4^{--}$, $Cl^-$, cations of divalent Mg and Mn, said dispersion having an acid pH preferably ranging from 0 to 3.

The polymer aqueous dispersion is stabilized with non-ionic surfactants, conventionally utilized for this purpose, in particular the ones of the class of the polyoxyethylated alkylphenols having 8-90 moles of ethylene oxide per mole of phenol.

The amount of phosphate ions in the aqueous composition must be such that the ratio between the weight of the phosphorus corresponding to the phosphate and the weight of the dry polymer ranges from 0.005/1 to 0.15/1, preferably from 0.02/1 to 0.08/1. Another essential ratio is the one between $Mg^{++}$ ions and/or $Mn^{++}$ ions and the phosphate anion, which shall range (expressed in atoms of Mg and/or Mn and atoms of P) from 0.5/1 to 2/1, preferably from 0.7/1 to 1.2/1.

The composition according to the invention can be prepared starting from an aqueous solution containing phosphate ions, $NO_3^-$ or $Cl^-$ or $SO_4^{--}$ ions and $Mg^{++}$ ions or $Mn^{++}$ ions, in such amounts as to satisfy the $Mg^{++}$ (or $Mn^{++}$)/phosphate ratio indicated hereinabove. This solution is then admixed with the fluorinated polymer aqueous dispersion in such a weight ratio that in the resulting mixture the phosphate ion amount with respect to the polymer present therein may be such as to fall within the abovesaid limits. The aqueous dispersion will contain a polymer amount preferably ranging from 30% to 70% by weight and it shall be stabilized with suitable surfactants, in particular with the ones of the non-ionic type specified above.

The aqueous solution of the metal cations and of the phosphate ions and of other anions of mineral acids can be prepared starting from a phosphoric acid solution at a concentration from 0.5 to 5M, preferably from 1 to 3M, and by addition of salts, oxides or hydroxides of Mg or Mn in such amounts that the atomic ratio between Mg or Mn and phosorus will range from 0.1 to 2, preferably from 0.5 to 2.

If Mg or Mn are added as oxides, hydroxides or carbonates, they can be suitably dissolved in mineral acids other than phosphoric acid, such as, for example, the nitric, hydrochloric, sulphoric acids, prior to addition to the phosphoric acid solution, or they can be directly dissolved in phosphoric acid, which has been previously added with mineral acids.

If Mn or Mg are added as salts of mineral acids, they can be either directly added to the phosphoric acid solution or they can be dissolved in water or in mineral acids solutions and subsequently added to the phosphoric acid solution, taking care, in the latter case, of not diluting the total concentration of phosphate ions in the solution over the limit of 0.5M.

Also the ratio in gram equivalents between Mg(II) or Mn/(II) and the mineral acids different from phosphoric acid is not critical with regard to the performances of the object of the invention; however, it should be preferably in the range from 0.5 to 2.

Also the type of mineral acid, different from phosphoric acid, which is added to the solution, is not particularly critical; however, if Mg(II) is used as a cation, it seems preferable to utilize a mixture of hydrochloric acid and nitric acid such that the ratio in gram equivalents between Mg(II), chloride ions and nitrate ions should be 1:x:y, wherein x and y are <1.

The composition according to the invention is applied by using known methods and devices to the metal substrate to be coated which has been previously sandblasted and degreased. The coating composition can be applied by spraying, by pouring, by using a roller and the like, in order to provide a film which, after drying and sintering (or melting) of the polymer, exhibits a thickness from 1 to 20 microns, preferably from 3 to 10 microns.

The heat-treatment of the applied film comprises a first step of drying at a not very high temperature (lower than 100° C.) which is followed by a thermal treatment at high temperature, up to 420° C. and preferably up to 400° C., in the case of PTFE, in order to cause the polymer to sinter or to partially melt.

The resulting coating sticks to the metal substrate and can be coated with a finish of conventional composition.

The following examples are given merely to illustrate possible embodiments of the invention.

EXAMPLE 1

A binder solution was prepared as follows: 24 g of $(MgCO_3)_4.Mg(OH)_2.5H_2O$ were solubilized in a solution containing 34.5 g of $H_3PO_4$ at 85%, 7.8 g of HCl at 37%, 23.5 g of $HNO_3$ at 65% and 10 g of deionized water; then the whole was filtered and diluted to 100 g with deionized water. In this solution, the Mg/P atomic ratio was equal to 0.8. The paint for primer was obtained by mixing in the order: suspension of PTFE at 60% by weight dispersed

| | |
|---|---|
| with 3.5% Triton X-100 | 41 g |
| aqueous suspension of $TiO_2$ at 37.5% by weight dispersed with sodium lauryl sulphate | 10 g |
| deionized water | 29 g |
| binding solution | 20 g |

In this composition, the P/PTFE gram ratio was equal to 0.075. This paint was sprayed onto an aluminium substrate previously sandblasted and degreased with toluene, dried at 60° C. and sintered at 390° C. for 8 minutes. The resulting film, having a thickness of 8 microns, was subjected to the adhesion test as described in standard ASTM D 3359-78, using a suitable squaring device (side of a single square=1 mm, for a total of 100 little squares): the adhesion degree resulted equal to 5, according to a scale indicated in said standard.

Onto an aluminium sheet coated in like manner there was applied, by using of a spray gun, a finish layer having the following composition:

| | |
|---|---|
| dispersion of PTFE at 60% (the same used for preparing the paint for primer) | 70 g |
| aqueous suspension of $TiO_2$ at 50% by weight dispersed with sodium lauryl sulphate | 10 g |
| deionized water | 7.7 g |
| sodium lauryl sulphate | 1.3 g |
| silicone resin (dissolved in toluene at 70% by weight) | 4 g |
| toluene | 7 g |

After drying at 60° C. and sintering at 390° C., a film having a total thickness of 40 microns was obtained. Cuts were made in such film in order to obtain a grid of 36 small squares, each of them having sides of 1 mm. Onto this grid, a strip of adhesive tape was applicated, which, after having been stripped off, did not remove film portions. been stripped off, did not remove film portions.

EXAMPLE 2

62 g of a water solution of $Mn(NO_3)_2$ at 50% were added to 14 g of $H_3PO_4$ at 85% and 24 g of deionized water (Mn/P atomic ratio=1.42).

Then, a paint for primer was prepared by mixing in the order:

| | |
|---|---|
| dispersion of PTFE at 60% | 45 g |
| suspension of $TiO_2$ at 37.5% | 11 g |
| deionized water | 22 g |
| binding solution of Mn | 22 g |

In this composition, the P/PTFE weight ratio was equal to 0.031.

The coating obtained on an aluminium substrate by operating according to the modalities described in example 1 exhibited an adhesion degree equal to 5.

A finishing layer having the same composition of the finishing layer of example 1 was applied on a substrate treated in like manner. In this case too, the adhesion of the film obtained (thickness=40 microns) was good.

EXAMPLE 3

58 g of $Mg(NO_3)_2.6H_2O$ and 16 g of $MgCl_2.6H_2O$ were dissolved in 80 g of deionized water; to this solution, 103 g of $H_3PO_4$ at 85% and 15 g of $(MgCO_3)_4.Mg(OH)_2.5H_2O$ were added. After complete dissolution, the whole was filtered and diluted to 300 g with deionized water (Mg/P atomic ratio=0.51).

The paint for primer was prepared according to the modalities described in example 1, thus obtaining a composition in which the P/PTFE weight ratio was equal to 0.075.

The adhesion of the film was equal to the one determined in the preceding examples, as regards both the film of the paint for primer and the film coated with the finishing layer.

EXAMPLE 4

A composition like the one described in example 1 was obtained and the resulting paint was sprayed onto sandblasted aluminium. After water evaporation at 60° C., the resulting film was dried at a temperature of 280° C.; then, the finishing layer was applied according to usual modalities and sintering was carried out at 390° C. for 9 minutes. Also in this case, a coating adhering to the substrate was obtained.

EXAMPLE 5

58 g of $Mg(NO_3)_2.6H_2O$ and 15 g of $MgCL_2.H_2O$ were dissolved in a mixture composed of 80 g of deionized water and 52.6 g of $H_3PO_4$ at 85%; 15 g of $(MgCO_3)_4.Mg(OH)_2.5H_2O$ were then dissolved; after complete dissolution the whole was filtered and diluted to 300 g with deionized water. In this way, a solution was obtained, which had a Mg/P atomic ratio equal to 1. By mixing such solution with the usual dispersion of PTFE at 60%, with water and with the $TiO_2$ dispersion in the ratios specified in example 1, a paint for primer was obtained (P/PTFE gram ratio=0.038), which provided, after application to the aluminium substrate, a film having a good adhesion characteristics (degree: 5). The finish, which was applied according to the usual modalities, provided performances analogous with those of the preceding examples.

EXAMPLE 6

61.3 g of Mn(NO$_3$)$_2$ at 50% in water were added to 19.7 g of H$_3$PO$_4$ at 85% and diluted to 100 g with deionized water. In such solution the Mn/P atomic ratio was equal to 1. The paint for primer was prepared according to the composition indicated in example 2 (P/PTFE gram ratio=0.043) and was sprayed onto an aluminium substrate. After sintering at 390° C., a film having an adhesion degree equal to 5 was obtained.

The finishing layer was applied with the same composition and modalities of the preceding examples, thus obtaining a film endowed with good adhesion properties.

EXAMPLE 1A-COMPARATIVE TEST

A solution having the following composition was prepared:

| | |
|---|---|
| Ca(NO$_3$)$_2$.4H$_2$O | 20 g |
| H$_3$PO$_4$ at 85% | 10.3 g |
| deionized H$_2$O | 25 g |

In this solution, the Ca/P atomic ratio was equal to 0.98.

The paint for primer was prepared as follows:

| | |
|---|---|
| suspension of PTFE at 60% by weight | 41 g |
| suspension of TiO$_2$ at 40% by weight dispersed with sodium lauryl sulphate | 10 g |
| binder solution | 32 g |
| deionized H$_2$O | 17 g |

In this paint, the P/PTFE gram ratio was equal to 0.066.

After application of this paint to the aluminium substrate and after sintering at 400° C. for 7 minutes (resulting thickness=6 microns), the adhesion of the coating was low.

EXAMPLE 2A-COMPARATIVE TEST

A paint for primer having the following composition was prepared:

| | |
|---|---|
| (MgCO$_3$)$_4$.Mg(OH)$_2$.5H$_2$O | 4.5 g |
| H$_3$PO$_4$ at 85% | 14.8 g |
| suspension of TiO$_2$ at 40% in water | 10 g |
| suspension of PTFE at 60% by weight | 60 g |
| deionized H$_2$O | 10.7 g |

The ratios were as follows:
Mg/P (atomic)=0.359
P/PTFE (by weight)=0.11

The paint was applied, by using a film spreading device on an aluminium substrate in order to obtain a coating which, after sintering at 400° C. for 7 minutes, exhibited a thickness of 7 microns.

Onto the same film, a finishing layer having the same composition of the finishing layer of example 1 was applied; such layer exhibited, after sintering at 400° C., a total thickness of 40 microns.

The film so obtained did not exhibit a good adhesion to the metal substrate.

What we claim is:

1. A composition suitable to form a coating layer on a metal surface, comprising an aqueous dispersion having an acid pH from 0 to 3 of a tetrafluoroethylene polymer, or tetrafluoroethylene copolymer or mixture thereof, the aqueous dispersion containing:
    (a) phosphate anions and other anions of mineral acids selected from the group consisting of NO$_3^-$, Cl$^-$, SO$_4^=$, the phosphate anion amount being such that expressed as "phosphorus/dry polymer" weight ratio it ranges from 0.005 to 0.15, and
    (b) Mg or Mn or mixtures thereof in the form of divalent cations their amount being such that (Mg+Mn)/P ratio expressed in atoms ranges from 0.5 to 2.

2. The composition according to claim 1, comprising an aqueous dispersion of polytetrafluoroethylene.

3. The composition according to claim 1, wherein the phosphorus/dry polymer ratio ranges from 0.02 to 0.08.

4. The composition according to claim 1, wherein the polymer amount ranges from 30 to 70% by weight.

5. The composition according to claim 1, wherein the aqueous dispersion contains phosphate anions in amounts higher than 0.5M.

* * * * *